United States Patent
Iida et al.

[11] 3,901,100
[45] Aug. 26, 1975

[54] ADJUSTING DEVICE FOR THE RECLINING SEAT OF AUTOMOTIVE VEHICLES

[75] Inventors: Teiji Iida; Masahide Hisayama, both of Toyota; Hisashi Ogawa, Kumana, all of Japan

[73] Assignee: Toyota Jidosha Kogyo Kabushiki Kaisha, Toyota, Japan

[22] Filed: July 11, 1973

[21] Appl. No.: 378,128

[30] Foreign Application Priority Data
July 14, 1972 Japan.............................. 47-70470

[52] U.S. Cl. .................... 74/530; 74/529; 297/379; 297/367
[51] Int. Cl.² ....................... G05G 5/06; B60N 1/02
[58] Field of Search ...... 74/529, 530; 297/366, 367, 297/379

[56] References Cited
UNITED STATES PATENTS

| | | | |
|---|---|---|---|
| 3,299,466 | 1/1967 | Werner | 74/471 X |
| 3,356,415 | 12/1967 | Putsch | 297/379 |
| 3,432,881 | 3/1969 | Putsch et al. | 297/366 X |
| 3,479,088 | 11/1969 | Bamaud | 297/366 X |
| 3,641,838 | 2/1972 | Turner | 74/530 |
| 3,727,978 | 4/1973 | Barriere et al. | 297/379 |

FOREIGN PATENTS OR APPLICATIONS
1,105,342  5/1954  France .............................. 297/367

Primary Examiner—Samuel Scott
Assistant Examiner—P. S. Lall
Attorney, Agent, or Firm—Stevens, Davis, Miller & Mosher

[57] ABSTRACT

A reclining seat adjuster embodied by the present invention, with which the seat back of the front seat can be prevented from being flung forwardly by the engagement between a tooth portion of a ratchet member and a pawl of an engagement piece even when an occupant on the rear seat might collide with the seat back of the front seat as in case of accident. The forward flinging of the seat back can be prevented by a first holding mechanism and a second holding mechanism even when the aforementioned meshing in the reclining adjuster is lost due to an extensive shock. The first holding mechanism is constituted with a stop face formed on the ratchet and a stop face of the pawl or engagement piece. The second holding mechanism is intended to function when the pawl of the engagement piece has been broken. It comprises the stop face of the above mentioned ratchet member and a block mounted on a lower bracket.

6 Claims, 3 Drawing Figures

ADJUSTING DEVICE FOR THE RECLINING SEAT OF AUTOMOTIVE VEHICLES

The present invention relates to reclining seats for automotive vehicles and, more particularly, to an adjusting device for the reclining seat which can safeguard the occupant at the time of collision or like accident of the vehicle by holding the seat back against forward flinging thereof through two holding mechanisms.

The usual reclining seat adjuster permits the adjustment of the inclination of the seat back by varying the position of the tooth portion of an engagement piece meshing with the tooth portion of a ratchet member relative thereto. The meshing between the ratchet tooth portion and engagement piece tooth portion also acts to take up sudden forward external force exerted to the seat back in such case as when the seat back of the front seat is struck by an occupant in the rear seat upon collision or like accident of the vehicle.

However, both ratchet member and engagement piece are provided together with other movable parts within a narrow space on each auto-cushion side, so that they inevitably have small size, small thickness and insufficient mechanical strength. Therefore, with a heavy impact force exerted to the seat back the meshing portions of the ratchet tooth portion and engagement piece tooth portion are likely to be broken, resulting in the forward flinging of the seat back. In such case, the occupant cannot be safeguarded.

This invention has an object of providing an adjusting device for the reclining seat, which has a two-fold safety mechanism capable of preventing the forward flinging of the seat back even when meshing portions of an inclination adjustment ratchet member and engaging piece are broken with a heavy impact force exerted to the seat back.

The component parts constituting the two-fold safety mechanism can be arranged within the space within which the prior-art reclining seat adjuster is assembled, so that there is no need of reducing the width of the auto-cushion. Also, the construction is simple and can be provided with low cost.

The above and other objects, features and advantages of the invention will become more apparent during the following discussion in connection with the accompanying drawings, in which.

Figure 1:
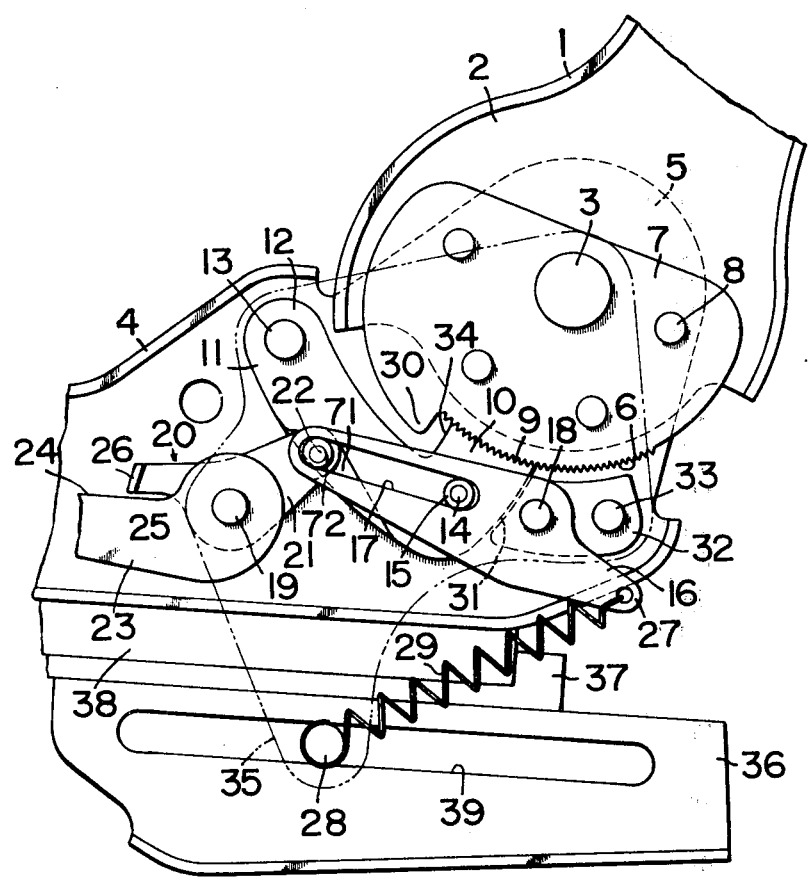
FIG. 1 is an elevational view of one embodiment of the device according to the invention.
Figure 2:
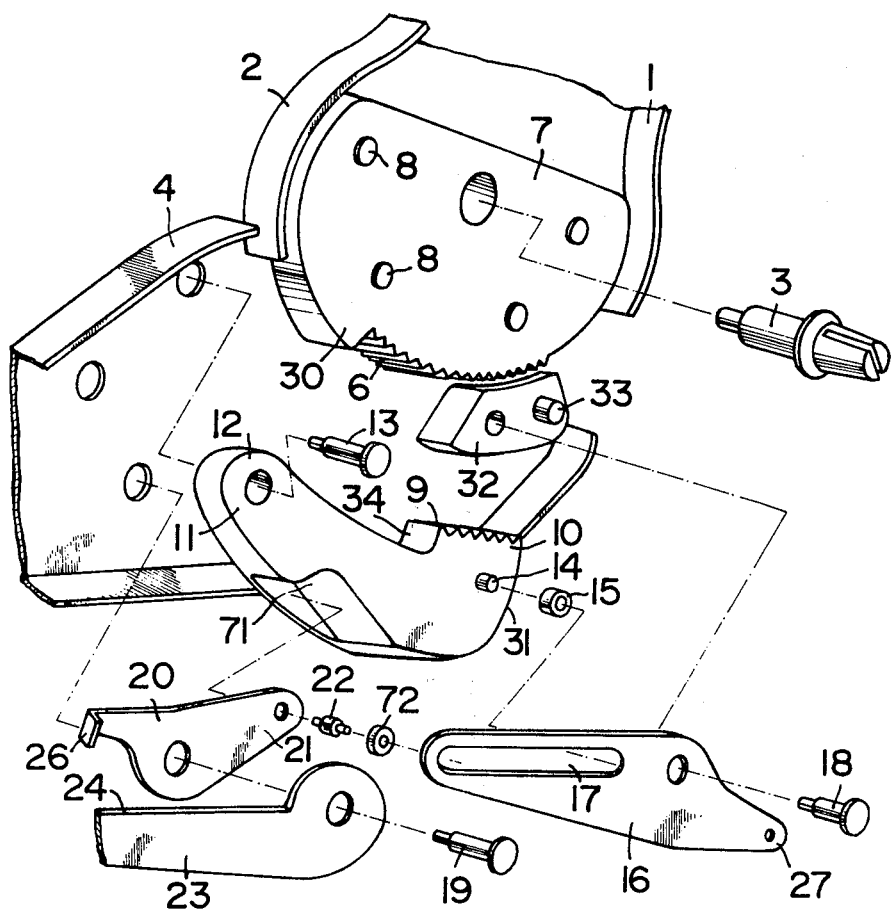
FIG. 2 is an exploded perspective view showing essential parts in the embodiment of FIG. 1.

Referring now to FIGS. 1 and 2, reference numeral 1 designates an upper bracket of a reclining seat. Its stem portion 2 is pivoted by a pin 3 to a pivotal mount portion 5 of a lower bracket 4. A spiral spring not shown is provided on one end of the pin 3 and biases the upper bracket 1 such that it tends to become upright.

A ratchet member 7 formed with a downwardly facing tooth portion 6 is secured by a plurality of rivets 8 to the stem portion 2 of the upper bracket 1. An engagement piece 11 formed in its one end portion 10 with an upwardly facing tooth portion 9 meshing with the afore-mentioned tooth portion 6 is pivoted at its other end portion 12 by a pin 13 to the lower bracket 4. The engagement piece 11 carries a roll 15, which is rotatably mounted on a pin 14 extending from its end portion 10 and rotatably fitted in an end of a slot 17 formed in a release lever 16, which is in turn pivoted by a pin 18 to the lower bracket 4. Fitted in the other end of the slot 17 of the release lever 16 is a pin 22 extending from one arm 21 of a sub-plate 20 pivoted by a pin 19 to the lower bracket 4.

Rotatably mounted on the pin 19 is an operating lever 23, whose upper edge 24 is adapted to engage with a bent portion 26 of the other arm 25 of the sub-plate 20. Attached to the rear end 27 of the release lever 16 is an end of a coil spring 29, whose other end is attached to a lock bar 28 to be described later. The release lever 16 is thus urged such that it tends to rotate in the clockwise direction (in FIG. 1) about the pin 18.

A roller 72 is rotatably mounted on an extension of the pin 22 extending from the side of the sub-plate 20 facing the lower bracket, and it is always urged against a cam surface 71 formed in the engagement piece 11 on the lower side thereof since the release 16 is urged in the clockwise direction in FIG. 1 by the coil spring 29. Thus, the engagement piece 11 is always urged against the ratchet member 7, so that its tooth portion 9 may be maintained in mesh with a fixed part of the tooth portion 6 of the ratchet member to maintain the upper bracket 1 at a fixed position.

By rotating the operating lever 23 in the clockwise direction, the bent portion 26 of the sub-plate 20 is raised by the top edge 24 of the lever 23 to cause the clockwise revolution of the pin 22 provided on the arm 21 of the sub-plate 20 about the pin 19 and counterclockwise rotation of the release lever 16 about the pin 18. As a result, the pin 14 received in the slot 17 of the release lever 16 is lowered, so that the tooth portion 9 of the engagement piece 11 formed in the end portion 10 thereof is demeshed from the ratchet tooth portion 6. In this state, the upper bracket 1 can be freely adjusted to a desired inclination. By returning the operating lever 23 to the initial position, the upper bracket 1 is again locked at a fixed position as mentioned above.

According to the invention, the following construction is added to the adjuster having the ratchet member and engagement piece which can be meshed with each other and demeshed from each other in the above way.

The ratchet member 7 is formed with a stepped stop face 30 terminating in the front end of the tooth portion 6. Also, a block 32 is secured by a rivet 33 and the pin 18 to the lower bracket 4 such that it defines a slight gap with respect to the pivotal orbit of the rear end 31 of the engagement piece 11. Further, the engagement piece 11 is formed in the end portion thereof 10 with a stop face 34 terminating in the front end of the tooth portion 6, the face 34 facing the afore-mentioned stop face 30 with the tooth portion 6 in mesh with the tooth portion 9. The stop face 30 and stop face 34 constitute the first holding mechanism.

The afore-mentioned parts are disposed between the pivotal juncture section of the upper and lower brackets 1 and 4 an outer bracket 35. The lower bracket 4 is secured to an upper seat track member 38 mounted on a lower seat track member 37 secured to a bracket 36 secured to the car room floor. The outer bracket 35 has a lock bar 28 received in an elongated opening 39 formed in the bracket 36. Thus, it can follow the fore-and-aft movement of the seat, and it also serves to firmly to combine the whole seat and the bracket 36. As will be described later, the stop face 34, the block 32 and broken tooth portion 9 of the engagement piece, constitute the second holding mechanism.

As mentioned earlier, the upper bracket 1 may be locked in a fixed inclination state by the mesh between the ratchet tooth portion 6 and tooth portion 9 of the engagement piece 6. In this state, the mechanism strength of the ratchet tooth portion 6 and the engagement piece tooth portion 9 can withstand physical shocks exerted to the seat back to a certain extent. If the mechanical strength is surpassed by an impact force exerted to the back by an occupant in the rear seat due to a collision or like accident, the meshing tooth portions are crushed. As a result, the locked state of the upper bracket 1 is lost, and the upper bracket is forwardly flung. The forward flinging of the upper bracket is checked as the stop face 30 strikes the stop face 34 of the engagement piece 11. This effect is provided by the first holding mechanism.

If the impact force is excessively great, the end portion 10 having the stop face 34 is forcibly separated from the rest of the engagement piece 11 after the impingement of the stop faces 30 and 34 against each other. As a result, the upper bracket 1 tends to be further forwardly flung. However, the separated end portion 10 of the engagement piece 30 is clamped between the stop face 30 and the block 32 secured to the lower bracket 4, thus preventing further forward flinging of the upper bracket 1. Thus, effect provided by the second holding mechanism. Thus, even if the size and shape of the end portion 10 or pawl of the engagement piece 11 are the same those in the prior art, the torque about the hinge pin 3 can be sufficiently coped with by the second holding mechanism.

Figure 3:
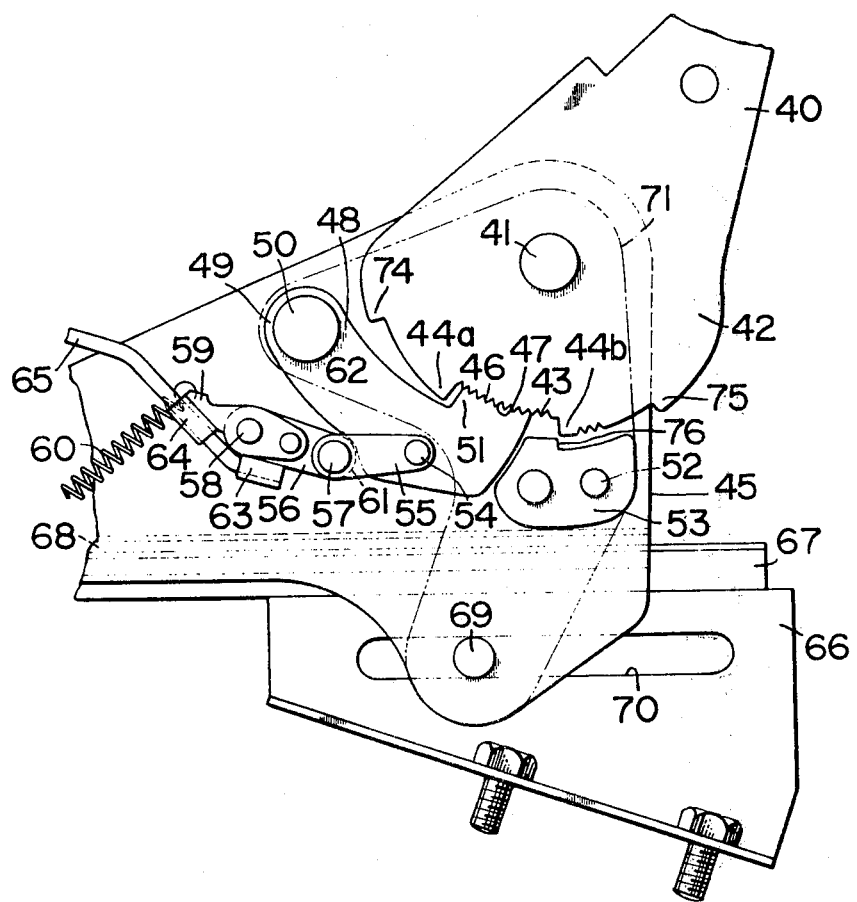
FIG. 3 is an elevational view similar to FIG. 1 but showing a modification of the embodiment of FIG. 1.

FIG. 3 shows a modification of the preceding embodiment. In this embodiment, a sector-shaped lower end of the pivotal juncture section 42 of the upper bracket 40 provided with a pin 41 is formed with a tooth portion 43 and shoulders 44$_a$ and 44$_b$ and are also formed with second shoulders 74 and 75 near the opposite ends of the sector-shaped portion. An engagement piece 48 formed in its one end portion 47 with an upwardly facing tooth portion 46 is pivoted at its other end portion 49 to the lower bracket 45. It is formed with a stop face 51, which faces the shoulder 44$_a$ with the tooth portion 47 in mesh with the tooth portion 34. A block 53 is secured by rivets 52 to the lower bracket 45 such that it defines a slight gap with respect to the pivotal orbit of the rear end of the engagement piece 48. It is provided with a shoulder 76 facing the shoulder 75.

To the engagement piece 48 is pivoted by a pin 54 a link 55, whose end remote from the pin 54 is linked by a pin 57 to a second link 56, which is in turn pivoted by a pin 58 to the lower bracket 45. The link 56 is urged in the counterclockwise direction by a spring 60 attached at one end to the end of the link 56 remote from the pin 57 and at the other end to a fixed pin not shown. A roller 61 is rotatably mounted on an extension of the pin 57 extending toward the lower bracket 45, and it is always urged against a cam face 62 formed along the lower edge of the engagement piece 48 by the spring force. Thus, the engagement piece 48 is urged by the roller 61 in the counterclockwise direction, so that its tooth portion 46 may be maintained in mesh with the tooth portion 43 of the upper bracket 40 to maintain the upper bracket at a fixed position. An operating rod 65 is secured by attachment pieces 63 and 64 to the second link 56. By rotating the rod 65 in the clockwise direction, the second link 56 and engagement piece 48 are rotated in the clockwise direction in FIG. 3 against the spring force of the spring 60. AS a result, the tooth portion 46 is demeshed from the tooth portion 43 of the upper bracket. In this state, the upper bracket 40 can be freely adjusted to a desired inclination. By returning the operating rod 65 to the initial position, the tooth portion 46 is again brought into mesh with the tooth portion of the upper bracket, so that the upper bracket may be again locked at a fixed position.

The lower bracket 45 has an upper seat track 68 mounted on a lower seat track 67 integrally secured to a bracket 66 secured to the vehicle body frame, and it can slide along the lower rack in the fore-and-aft direction. Also, it has a lock bar 69 received in an elongate opening 70 formed in the bracket 66, so that it is firmly coupled to the vehicle body frame. In FIG. 3, numeral 71 designates an outer bracket provided on the outer side of the afore-mentioned various parts.

With this construction, similar to the construction of FIGS. 1 and 2, if the mesh between the tooth portion or pawl 46 and tooth portion 43 of the upper bracket is lost due to collision or like accident, the action of the first holding mechanism consisting of the shoulder 44$_a$ and stop face 51 of the engagement piece. If the end portion of the engagement piece 48 is broken due to a greater external force, the second lock state is brought about with the broken end portion of the engagement piece clamped between the shoulder 44$_a$ and the block 53, thus preventing the forward flinging of the seat back. Should piece 48, by reason of accident, no longer lie between shoulder 44a and block 53, block 53 is engaged by a second shoulder 74.

As has been described in the foregoing, according to the invention even when the meshing portions of the ratchet tooth portion and the engagement piece are crushed due to a forward impact force exerted to the seat back of the reclining seat, the forward flinging of the seat back can be reliably prevented by the two-fold holding mechanism constituted by the engagement between the outer bracket side stop face and the engagement piece side stop face and the clamping of the broken piece of the engagement piece between the upper bracket side stop face and the block. Thus, it is possible to sufficiently and reliably safeguard the occupant.

What we claim is:

1. An adjusting device for the reclining seat of automotive vehicles comprising:

a lower bracket slidably mounted on a lower seat track member secured to the vehicle frame, a upper bracket pivotably mounted on a pin extending from said lower bracket, said upper bracket being spring biased such that it tends to become upright;

a ratchet member on said upper bracket, said ratchet member having a sector-shaped downwardly facing ratchet tooth portion and a radially raised shoulder portion adjacent one end of said ratchet tooth portion;

an engagement piece pivotally connected to said lower bracket, a portion of said engagement piece comprising:

a toothed portion to be meshed with said ratchet tooth portion, a forward stop face adapted to abut said shoulder portion of said ratchet member when said upper bracket is biased forward by an impact force beyond the capacity of the ratchet teeth to hold, and a rear face;

control means for selectively moving the toothed portion of said engagement piece into meshing engagement with the ratchet tooth portion of said ratchet member on said upper bracket whereby said upper bracket can be adjusted in inclination relative to said lower bracket; and a block on said lower bracket, said block having a front face whereby when an impact force is excessively great so that the portion of said engaging piece is separated from the remainder, the portion is clamped between the shoulder portion of the ratchet member and the front face of the block.

2. An adjusting device as claimed in claim 1, wherein: said block is positioned with a portion of its front face closely adjacent the periphery of the ratchet tooth portion within an arc defined by the movement of the radially outermost tip of the shoulder portion.

3. An adjusting device as claimed in claim 1, wherein: said block is rigidly connected to said lower bracket.

4. An adjusting device as claimed in claim 3, wherein: said control means comprises:

a first link pivotally connected to said engagement piece, a second link pivotally connected to said first link and said lower bracket, a pin pivotally connecting said first link and said second link, a roller on said pin, and a control rod connected to said second link, and said engagement piece has a lower edge defining a cam face along which the roller may move.

5. An adjusting device as claimed in claim 1, wherein: said block is pivotally connected to said lower bracket.

6. An adjusting device as claimed in claim 5, wherein: said control means comprises:

a sub-plate pivotally connected to said lower bracket, an operating lever pivotally connected to said lower bracket, and a release lever pivotally connected to said block and connected to an end of said sub-plate.

* * * * *